Sept. 19, 1939.                J. D. GREENER                2,173,742
             IMPLEMENT FOR ROOT PRUNING AND LIFTING SEEDLINGS
                 Filed Nov. 30, 1938          3 Sheets-Sheet 1
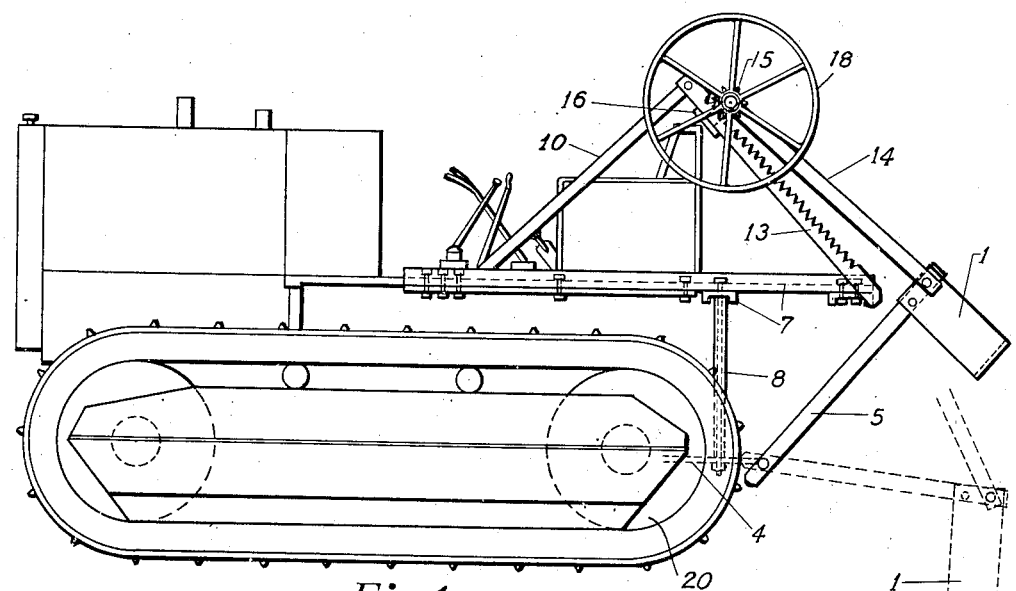
Fig.1
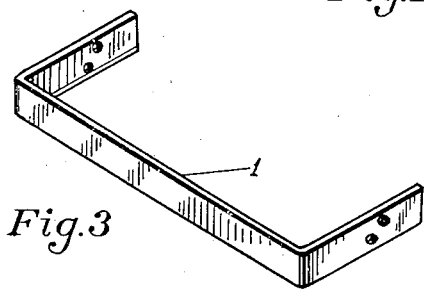
Fig.3
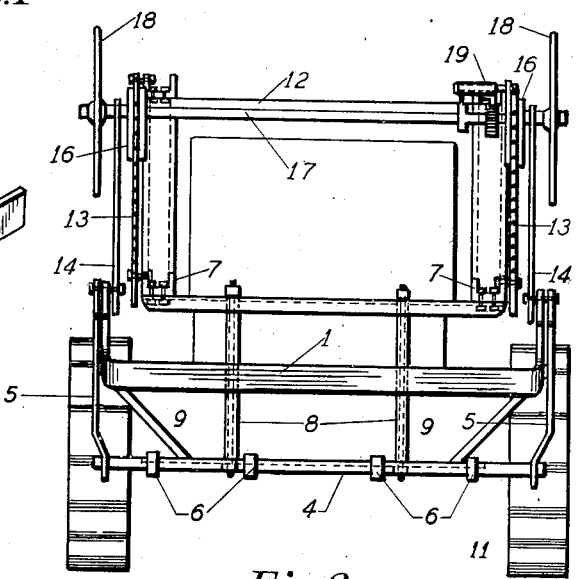
Fig.2
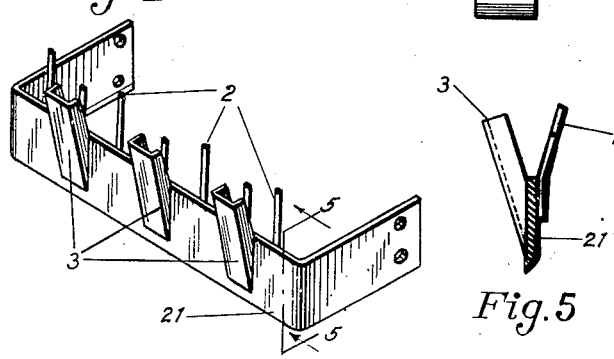
Fig.4
Fig.5
Inventor
James D. Greener
By
Attorneys Patented Sept. 19, 1939

2,173,742

UNITED STATES PATENT OFFICE 2,173,742

IMPLEMENT FOR ROOT PRUNING AND LIFTING SEEDLINGS

James D. Greener, Brooklyn, Miss., dedicated to the free use of the People in the Territory of the United States Application November 30, 1938, Serial No. 243,174

5 Claims. (Cl. 55—18)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an implement for root pruning and lifting tree seedlings and is more particularly concerned with such a device which can be attached to a tractor.

One of the objects of this invention is the provision of a device of the type mentioned which can not only be attached directly to a tractor but which is also adjustable for regulating the depth of the pruning or lifting blade by the operator of the tractor.

The following description considered together with the accompanying drawings will more fully disclose this invention, its constructions, arrangements, and combinations of parts, and further objects and advantages thereof will be apparent.

In the drawings:

Figure 1 is a side elevational view of an embodiment of this invention attached to a conventional tractor.

Figure 2 is a rear end view of Figure 1.

Figure 3 is an isometric view of the root pruning blade.

Figure 4 is an isometric view of the lifting blade.

Figure 5 is a cross-sectional view of Figure 4 along the line 5—5.

Figure 6:
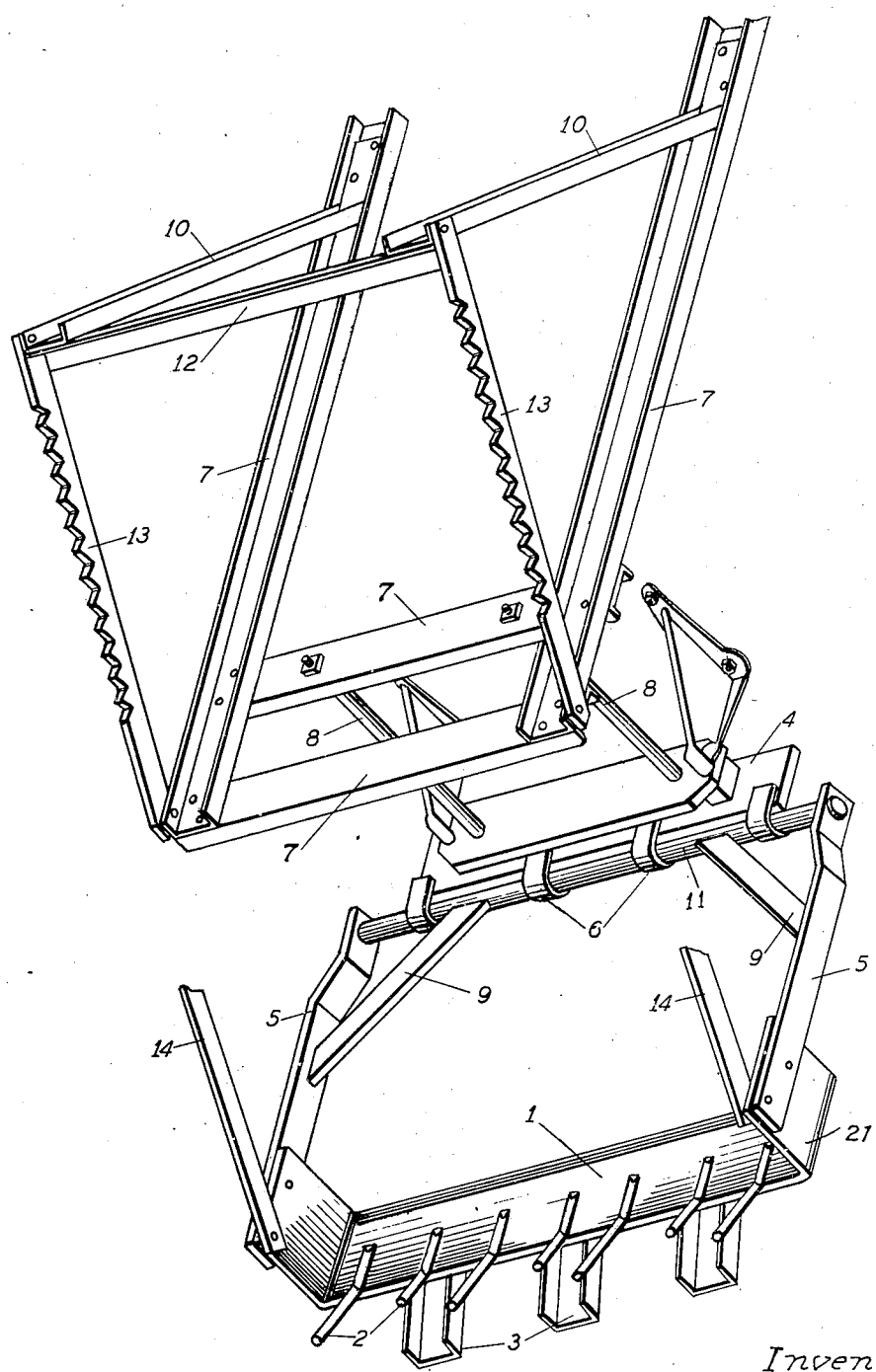
Figure 6 is an isometric view showing the frame details of this invention with the lifting blade attached.
Figure 7:
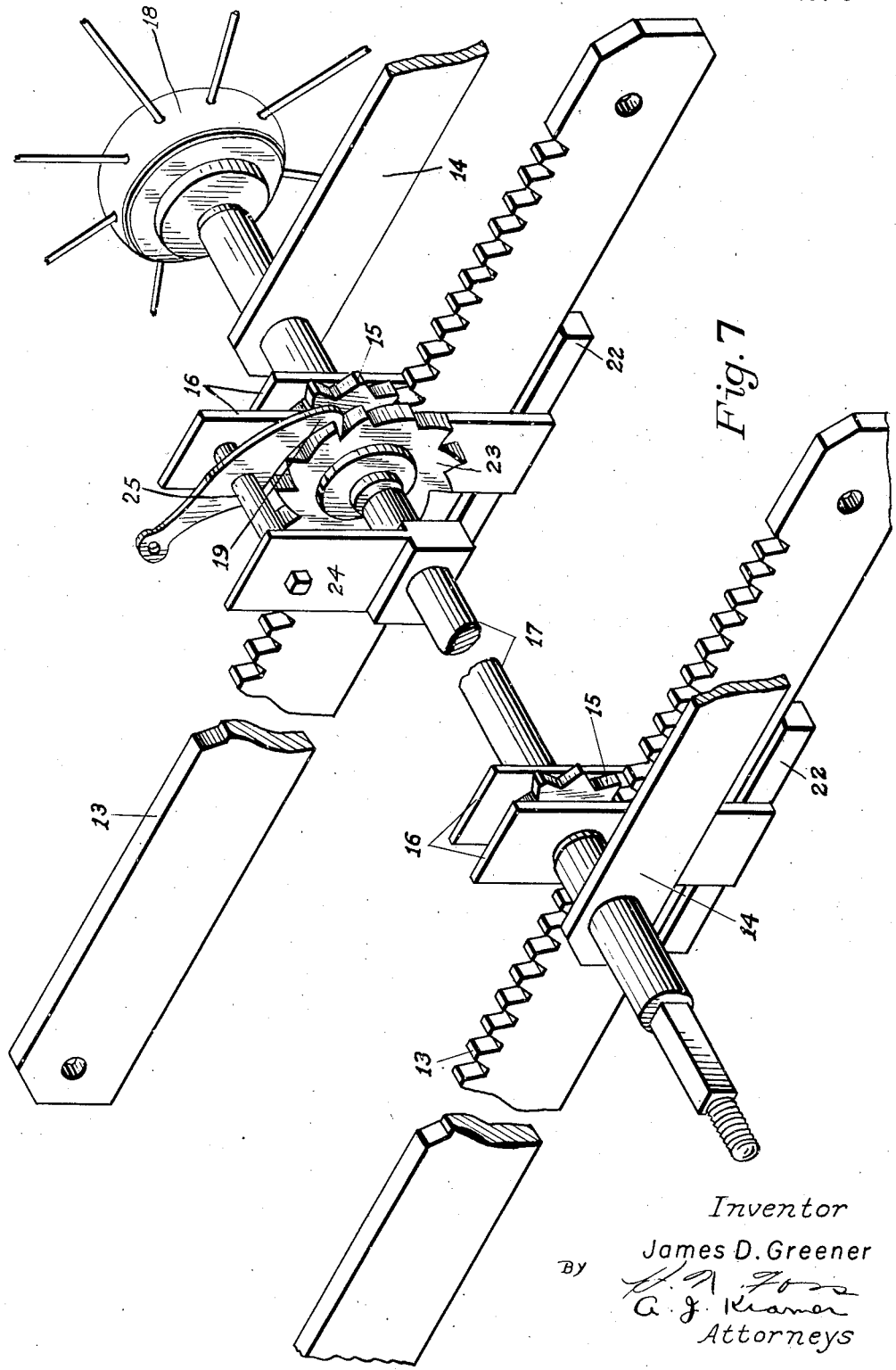
Figure 7 is an isometric view of the lifting gear and blade holding assembly.

Referring with more particularity to the drawings in which like numerals designate like parts, this device is attached to the tractor 20 by means of a drawbar plate 4, said plate replacing the lower-standard drawbar plate of the conventional tractor. A shaft 11 is rotatably mounted in strap bearings or clamps 6 secured to said plate 4. Parallel blade supports 5, 5 are secured at the opposite ends of the shaft 11. Said members 5, 5 are braced to the shaft 11 by means of angle braces 9, 9, substantially as shown. The outer ends of the supports 5, 5 removably carry the U-shaped pruning blade 1 or the lifting blade 21.

The base frame 7 is adapted to be horizontally secured on the tractor, substantially as shown, and is partially supported by stanchions 8, 8 extending from the drawbar plate 4. The forward end of the base frame 7 is bolted to the tractor substantially as shown in Figure 1.

Racks 13, 13 are disposed on the rear end of the base frame 7 and slope downwardly toward the front of the tractor. These racks are held in this sloping position by means of braces 12 and 10, 10. Two pinion gears 15, 15 are secured to a shaft 17 and are adapted to mesh with the racks 13, 13, respectively. The shaft 17 extends outwardly a considerable distance beyond the racks 13, 13 to each end of which wheels 18, 18, respectively, are secured. Between each of the wheels 18 and the racks 13 connecting links 14, 14 are hinged to the shaft 17. The other ends of said connecting links 14, 14 are removably hinged to the outer ends of the blade supports 5, 5. The shaft 17 is prevented from moving laterally with respect to the racks 13, 13 by means of two sets of gear guide plates 16, 16, each set straddling one of the two racks 13, 13 and the pinions 15, 15. These plates extend downward and are secured together between the racks 13, 13 by means of bearing plates 22, 22 slidably contacting the bottom of each of said racks 13, 13, respectively.

A ratchet 23 is fixed to the shaft 17 between the racks 13, 13 near one of the two sets of guide plates 16. A bracket 24 is loosely mounted on shaft 17 on the side of the rachet 23 opposite the set of guide plates 16 closest to said rachet 23. Above the ratchet 23 between the bracket 24 and the guide plate on the opposite side of said rachet, a shaft 25 is secured parallel to the shaft 17. Said shaft 25 is provided with a hinged dog 19 adapted to register with selective teeth of the ratchet 23. By these means the shaft 17 can be secured in any desired position along the racks 13, 13.

The machine is adapted to use either the pruning blade 1 or, as a substitute therefor, the lifting blade 21. The lifting blade 21 has substantially the same shape as the pruning blade 1 but it is provided with additional members, namely landslides 3 and soil-breakers 2, said soil-breakers being for the purpose of loosening the soil around the roots.

The operation of this invention is as follows: The tractor 20 is placed over the seed bed. The dog 19 is released from the ratchet 23 permitting the weight of the blade 1 or 21 (whichever is attached to the support members 5, 5) to carry the shaft 17 with parts attached thereto downward on the racks 13, 13 until the blade rests on the ground. As the tractor is moved forward, the pruning or lifting blade is forced beneath the tree seedlings by simply turning one or both of the wheels 18, 18 until the desired working depth is obtained as illustrated by the broken construction lines in Figure 1. The desired depth of the blade is maintained by locking the ratchet 23 with the dog 19. When the pruning blade 1 is used the roots are simply severed but when the lifting blade 21 is used it moves forward on the landslides 3 and not only cuts the roots of the seedlings but loosens the soil around the roots by means of soil-breakers 2.

Having thus described my invention, I claim:

1. An implement of the character described comprising a frame adapted to be secured to a tractor, a blade for pruning seedling roots secured to arms hinged to said frame, rack gears slopingly secured to said frame, pinions meshing with said rack gears, a rod secured to and carried by said pinions, links connecting said rod to said blade, means for manually rotating said rod, and means for securing said rod in selected positions along said rack gears.

2. An implement of the character described comprising a frame adapted to be secured to a tractor, a blade for pruning seedling roots secured to arms hinged to said frame, rack gears slopingly secured to said frame, pinions meshing with said rack gears, a rod secured to and carried by said pinions, links connecting said rod to said blade, wheels secured to the ends of said rod for manually imparting rotation thereto, and means for securing said rod in selected positions along said rack gears.

3. An implement of the character described comprising a frame adapted to be secured to a tractor, a blade for pruning seedling roots secured to arms hinged to said frame, rack gears slopingly secured to said frame, pinions meshing with said rack gears, a rod secured to and carried by said pinions, links connecting said rod to said blade, means for manually rotating said rod, and a dog and ratchet assembly for locking said rod in selected positions along said rack gears.

4. An implement of the character described comprising a frame adapted to be secured to a tractor, a blade for lifting seedlings and pruning their roots, said blade being secured to arms hinged to said frame, rack gears slopingly secured to said frame, pinion gears meshing with said rack gears, a shaft secured to and carried by said pinion gears, links connecting said rod to said blade, means for rotating said rod, and means for securing said rod in selected positions along said rack gears.

5. An implement of the character described comprising a frame adapted to be secured to a tractor, a blade for lifting seedlings and pruning their roots, said blade being secured to arms hinged to said frame, rack gears slopingly secured to said frame, pinion gears meshing with said rack gears, a shaft secured to and carried by said pinion gears, links connecting said rod to said blade, wheels secured to the ends of said rod for manually imparting rotation thereto, and a dog and ratchet assembly for locking said rod in selected positions along said rack gears.

JAMES D. GREENER.